(12) United States Patent
Bayer et al.

(10) Patent No.: US 10,335,756 B2
(45) Date of Patent: Jul. 2, 2019

(54) APPARATUS FOR INTRODUCTION OF DROPLETS INTO A REACTOR

(71) Applicant: BASF SE, Ludwigshafen am Rhein (DE)

(72) Inventors: Robert Bayer, Sinsheim (DE); Juergen Freiberg, Lampertheim (DE); Oliver Gampfer, Hochborn (DE); Marco Krueger, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/564,219

(22) PCT Filed: Mar. 23, 2016

(86) PCT No.: PCT/EP2016/056368
§ 371 (c)(1),
(2) Date: Oct. 4, 2017

(87) PCT Pub. No.: WO2016/162209
PCT Pub. Date: Oct. 13, 2016

(65) Prior Publication Data
US 2018/0126351 A1    May 10, 2018

(30) Foreign Application Priority Data
Apr. 8, 2015  (EP) .................... 15162807

(51) Int. Cl.
*B01J 4/00* (2006.01)
*B01J 19/26* (2006.01)
*C08F 2/01* (2006.01)

(52) U.S. Cl.
CPC ............. *B01J 4/002* (2013.01); *B01J 4/007* (2013.01); *B01J 19/26* (2013.01); *C08F 2/01* (2013.01);
(Continued)

(58) Field of Classification Search
CPC ...... B01J 4/00–002; B01J 4/007; B01J 19/00; B01J 19/26; B01J 2219/18;
(Continued)

(56) References Cited

U.S. PATENT DOCUMENTS

| | | |
|---|---|---|
| 7,727,586 B2 | 6/2010 | Bruhns et al. |
| 7,994,266 B2 | 8/2011 | Ducker et al. |

(Continued)

FOREIGN PATENT DOCUMENTS

| | | |
|---|---|---|
| WO | WO-2006/079631 A1 | 8/2006 |
| WO | WO-2007/031441 A2 | 3/2007 |

(Continued)

OTHER PUBLICATIONS

International Search Report for Patent Application No. PCT/EP2016/056368, dated Jun. 24, 2016.

*Primary Examiner* — Natasha E Young
(74) *Attorney, Agent, or Firm* — Marshall, Gerstein & Borun LLP (57) ABSTRACT

The invention relates to an apparatus for introduction of droplets into a reactor, comprising a holder for at least one dropletizer unit, where the dropletizer unit has a feed for a liquid to be dropletized and a dropletizer plate and the dropletizer plate has holes through which a liquid to be dropletized is introduced into the reactor, where the holder for the at least one dropletizer unit can be pushed into the reactor or pulled out of the reactor through an opening in the shell of the reactor. At least one rail is accommodated within the reactor and is used to guide the holder for the at least one dropletizer unit along it.

17 Claims, 3 Drawing Sheets

(52) U.S. Cl.
CPC .. *B01J 2219/185* (2013.01); *B01J 2219/1943* (2013.01)

(58) Field of Classification Search
CPC .............. B01J 2219/185; B01J 2219/19; B01J 2219/194; B01J 2219/1941; B01J 2219/1943; C08F 2/00; C08F 2/01
See application file for complete search history.

(56) References Cited

U.S. PATENT DOCUMENTS

| | | |
|---|---|---|
| 8,013,087 B2 | 9/2011 | Losch et al. |
| 8,114,320 B2 | 2/2012 | Losch et al. |
| 9,029,485 B2 | 5/2015 | Kruger et al. |
| 9,073,040 B2 | 7/2015 | Dobrawa et al. |
| 2015/0322188 A1 | 11/2015 | Bauer et al. |

FOREIGN PATENT DOCUMENTS

| | | |
|---|---|---|
| WO | WO-2008/040715 A2 | 4/2008 |
| WO | WO-2008/086976 A1 | 7/2008 |
| WO | WO-2010/003855 A2 | 1/2010 |
| WO | WO-2011/026876 A1 | 3/2011 |
| WO | WO-2014/118025 A1 | 8/2014 |

APPARATUS FOR INTRODUCTION OF DROPLETS INTO A REACTOR

CROSS-REFERENCE TO RELATED APPLICATIONS

This application is the U.S. National Phase of PCT/EP2016/056368, now WO 2016/162209, filed Mar. 23, 2016, which claims the benefit of European Patent Application No. 15162807.0, filed Apr. 8, 2015.

The invention relates to an apparatus for introduction of droplets into a reactor, especially a reactor for preparing poly(meth)acrylates, comprising a holder for at least one dropletizer unit, where the dropletizer unit has a feed for a liquid to be dropletized and a dropletizer plate and the dropletizer plate has holes through which a liquid to be dropletized is introduced into the reactor, where the holder for the at least one dropletizer unit can be pushed into the reactor or pulled out of the reactor through an opening in the shell of the reactor.

Poly(meth)acrylates are employed, in particular, as water-absorbing polymers used in the production of diapers, tampons, sanitary napkins and other hygiene articles for example, and also as water-retaining agents in market gardening.

The properties of the water-absorbing polymers may be adjusted via the degree of crosslinking. As the level of crosslinking increases, gel strength increases and absorption capacity decreases. This means that as absorption under pressure increases, centrifuge retention capacity decreases while at very high levels of crosslinking, absorption under pressure also decreases again.

To improve performance properties, for example liquid conductivity in the diaper and absorption under pressure, water-absorbing polymer particles are generally postcrosslinked. This increases only the level of crosslinking at the particle surface, which makes it possible to decouple absorption under pressure and centrifuge retention capacity at least to an extent. This postcrosslinking can be performed in an aqueous gel phase. Generally, however, ground and sieved polymer particles are surface coated with a postcrosslinker, thermally postcrosslinked and dried. Crosslinkers suitable for this purpose are compounds comprising at least two groups which can form covalent bonds with the carboxylate groups of the hydrophilic polymer.

Different processes are known for producing the water-absorbing polymer particles. For instance, the monomers and any additives used for producing poly(meth)acrylates may be added to a mixing kneader in which the monomers react to afford the polymer. Rotating shafts with kneading bars in the mixing kneader break up into chunks the polymer being formed. The polymer withdrawn from the kneader is dried and ground and sent for further processing. In an alternative version the monomer is introduced into a reactor for droplet polymerization as a monomer solution which may also comprise further additives. The monomer solution breaks up into droplets upon introduction into the reactor. The mechanism of droplet formation may be turbulent or laminar jet breakup, or else dropletization. The mechanism of droplet formation depends on the entry conditions and the properties of the monomer solution. The droplets fall downward in the reactor, in the course of which the monomer reacts to afford the polymer. In the lower region of the reactor there is a fluidized bed into which the polymer particles being formed from the droplets by the reaction fall. A postreaction then takes place in the fluidized bed. Such processes are described, for example, in WO-A 2006/079631, WO-A 2008/086976, WO-A 2007/031441, WO-A 2008/040715, WO-A 2010/003855 and WO-A 2011/026876.

The introduction of the monomer solution into the reactor for droplet polymerization is effected, for example, as described in WO-A 2014/118025 with dropletizer probes comprising an inner tube mounted so as to be movable within an outer tube. Positioned at the base of the inner tube are dropletizer plates through which the monomer solution is dropletized into the reactor. By virtue of the movability in the inner tube, the dropletizer probes can be removed for maintenance purposes.

The disadvantage of mounting the dropletizer plates at a base of a pipe, however, is increased installation complexity, since the tube has to be rotated after being pulled out, in order to make the dropletizer plates accessible. In addition, a single-sided rotatable bearing is disadvantageous because of the necessary length of the dropletizer probes and the associated bending effects. In addition, the inner tube may become wedged in the outer tube when pulling it out or pushing it in.

It is therefore an object of the present invention to provide an apparatus for introduction of droplets into a reactor, in which the dropletizer plates have good accessibility and allow easy installation or deinstallation.

This object is achieved by an apparatus for introduction of droplets into a reactor, comprising a holder for at least one dropletizer unit, where the dropletizer unit has a feed for a liquid to be dropletized and a dropletizer plate and the dropletizer plate has holes through which a liquid to be dropletized is introduced into the reactor, where the holder for the at least one dropletizer unit can be pushed into the reactor or pulled out of the reactor through an opening in the shell of the reactor, wherein at least one rail is accommodated within the reactor and is used to guide the holder for the at least one dropletizer unit along it.

The use of a rail rather than the outer tube known from the prior art has the advantage that the installation and deinstallation of the dropletizer units is possible by simple insertion or removal from above, and that wedging of an inner tube which is moved within an outer tube can be avoided.

In one embodiment of the invention, the holder for the at least one dropletizer unit being guided is suspended on the rail. The suspended guiding of the at least one dropletizer unit makes it possible to provide only one rail. Especially in the case of a high reactor diameter, this has the advantage that simple installation is possible, since it is unnecessary to align at least two rails exactly parallel over a long distance, in order to be able to achieve undisrupted movement of the holder for the at least one dropletizer unit.

In an alternative embodiment, the holder being guided rests on two rails in the reactor. Although it is necessary here to align the rails with respect to one another such that undisrupted movement of the holder for the at least one dropletizer unit is possible, this embodiment has the advantage that it is not necessary to provide any complex suspension system with which the holder is guided on the rail. Instead, it is possible to place the holder directly onto the rails and to move it thereon.

In a preferred embodiment, the rails are two contact surfaces on a pipe open at the base or a suitably configured edge profile on which the holder for the at least one dropletizer unit rests. The pipe open at the bottom results in additional screening above the holder for the at least one dropletizer unit, since, for example, gas which is introduced above the apparatus for introduction of droplets into the reactor hits the pipe and is deflected thereby around the apparatus for introduction of droplets, such that it does not flow directly onto the holder for the at least one dropletizer unit and the dropletizer unit. This is advantageous especially when hot gas is being supplied and direct contact of the hot gas with the dropletizer units is to be avoided.

When the rails are formed on a pipe, it is possible for the pipe to have any desired cross section. It is merely necessary the choose the cross section such that the holder for the at least one dropletizer unit can be moved within the pipe. For example, it is possible for the pipe to have a circular cross section or else to have a flattened form, such that the pipe has an oval or elliptical cross section. Another possibility is a cross section in the shape of a polygon having any number of corners, for example three, four, five, six, seven or eight corners, or else any other number of corners. The edges between the corners here may be equal in length or of different length. It is also possible for the edges to be curved or straight.

In order to enable undisrupted movement of the holder for the at least one dropletizer unit, it is additionally advantageous when the contact areas run parallel to the opening at the base of the pipe. This ensures that the opening in the pipe runs in such a way that, with the holder for the at least one dropletizer unit pushed in, the dropletizer unit is in the region of the opening, such that the droplets can fall through the opening in the pipe into the reactor. It is particularly preferable here when the contact surfaces bound the opening at the base of the pipe in the axial direction. For this purpose, it is possible, for example, to bend the edges that bound the opening in such a way that each forms a contact surface on which the holder for the at least one dropletizer unit can be guided. Alternatively, it is of course also possible to introduce rails into the pipe as separate components and to secure them to the pipe. Suitable for this purpose are both releasable connections such as screw connections, or else non-releasable connections such as riveting, bonding, soldering or welding. However, it is preferable to bend the edges that bound the opening, in order that these form the rails in the form of contact surfaces.

In order to be able to assure undisrupted pulling-out of the holder for the at least one dropletizer unit, it is additionally preferable when at least one rail is provided in the region of the opening outside the reactor and is used to guide the holder for the at least one dropletizer unit along it when it is pulled out of the reactor or pushed into the reactor. It is particularly preferable here when the at least one rail outside the reactor forms an extension of the at least one rail within the reactor. This has the advantage that there is no need to provide different guides on the holder, with which the holder for the at least one dropletizer unit is guided firstly within the reactor and secondly outside the reactor on the at least one rail. In order that the holder for the at least one dropletizer unit can be pushed into the reactor and pushed out of the reactor without disruption, it is additionally necessary for the at least one rail within the reactor and the at least one rail outside the reactor to have only a minimum height offset, i.e. a height offset of less than 5 mm, preferably of less than 2 mm and especially no height offset at all. Through the use of lowered transition pieces at the ends of the rails within and outside the reactor, it is possible to increase the permissible separations. It is also possible in this way to at least partly compensate for thermal expansion effects of the reactor which can lead to an increase in the height offset between the rails within and outside the reactor. In addition, it is possible to mount the rails outside the reactor on height-adjustable feet, in order to compensate for the height offset that occurs in the case of a hot reactor.

In addition, rather than a rail, in the region of the opening outside the reactor, it is also possible to use a movable suspension system or a movable support system at the end of the holder for the dropletizer unit.

Through the possibility of being able to pull the holder for the at least one dropletizer unit out of the reactor and push it in, direct access to the dropletizer units is possible, for example for maintenance purposes. It is preferable when the at least one dropletizer unit can be deinstalled. In addition to renewal or cleaning of the dropletizer units in the pulled-out state, this also enables rapid exchange of the dropletizer units. This allows the holder together with the dropletizer units to be pushed back in again after an exchange, and the reactor to be operated with full capacity. The downtimes of the individual dropletizer units are minimized further in this way.

In one embodiment, the at least one rail can be deinstalled outside the reactor. When a plurality of devices are used for introduction of droplets into the reactor, this firstly avoids the need for at least one rail to be installed outside the reactor as well for each apparatus, and instead allows the rail to be provided outside the reactor only when the corresponding apparatus is to be pulled out of the reactor, for maintenance purposes for example. A further advantage is that a long rail does not project outside the reactor shell, which constitutes additional stress on the reactor shell, for a prolonged period. The at least one rail is only ever installed on the reactor when the apparatus for introduction of droplets is to be pulled out of the reactor.

Since the reactor is subject to a significant thermal expansion of generally several centimeters because of its necessary height, which is required to obtain a sufficient residence time of the droplets, it is additionally advantageous if the rail installed outside the reactor or the movable suspension system or support system has height compensation. For this purpose, it is possible, for example, to mount a suspension system, for example by means of cables or a linkage system on the reactor shell above the rail, the movable suspension system or the movable support system, in order to keep the rails, movable support system or suspension system in a constant position relative to the opening in the reactor shell, through which the holder for the at least one dropletizer plate can be pulled out or pushed in. It is particularly preferable in this case to configure the suspension system in such a way that the position of the rail, the movable suspension system or the movable support system is adjustable in accordance with the thermal expansion of the reactor shell.

In order to avoid gas flowing out of the reactor or else ambient air flowing into the reactor with the apparatus for introducing droplets pulled out, it is preferable when a flap mounted in the opening can be used to close the opening when the holder for the at least one dropletizer unit has been pulled out. As soon as the apparatus for introducing droplets has been pulled out of the reactor, the flap is closed, such that there can be no exchange of gas with the environment. It is particularly preferable when the flap is mounted on the outside of the reactor shell and is closed electrically, mechanically, hydraulically or pneumatically when the holder for the at least one dropletizer unit has been pulled out of the reactor. Alternatively, it is also possible to secure the flap with springs, such that the flap automatically shuts by default when the holder for the at least one dropletizer unit has been pulled out of the reactor. However, preference is given to an electrical, mechanical, hydraulic or pneumatic actuator for closing the flap, in order to prevent any injury to operators resulting from the automatic closure of the flap. In the case of electrical, mechanical, hydraulic or pneumatic actuation of the flap, it is additionally preferable when a signal is given when the holder for the at least one dropletizer unit has been pulled out and the flap is open, in order to ensure that the flap remains closed whenever no apparatus for introduction of droplets into the reactor has been inserted at the appropriate position. This additionally has the advantage that an operator tasked with pulling out the apparatus for introduction of droplets, for maintenance purposes for example, cannot forget to close the flap. The signal may be given in a visual manner, for example by means of a warning light, or in an acoustic manner, for example by means of a warning tone. A combined optical and acoustic signal is also conceivable. In addition, for example, electrical contact makers on the outer rail may signal that the dropletizer unit has been completely pulled out, and send a signal to close the flap. The signal is preferably sent to a control unit with which fully automatic closure of the flap is controlled. In the case of hydraulic or pneumatic actuation of the flap, valves are actuated for this purpose, or in the case of electrical actuation an electric motor. By means of a suitable outflow control system and optionally further status-signaling devices, for example contact signaling devices or approach sensors, which detect that the dropletizer unit has been completely run out or completely pushed in, the complete insertion and removal operation of the dropletizer unit can be partly or fully automated.

If several apparatuses for introduction of droplets are accommodated in the reactor, it is possible, in the event of removal of just one of the apparatuses, for example for cleaning, to continue to operate the reactor with the other apparatuses for introduction of droplets. This does reduce the conversion in the reactor because of the smaller number of apparatuses for introduction of droplets and the lower throughput caused thereby, but it is still greater than when the reactor has to be completely shut down and there is no conversion at all.

As an alternative to a flap in the reactor, it is also possible for a stop formed at the end of the holder for the at least one dropletizer unit to stop the holder for the at least one dropletizer unit at the inside of the reactor shell when it is pulled out, and to close the opening when the holder for the at least one dropletizer unit has been pulled out. In this case, although access to the dropletizer units is assured and the opening is closed by means of the stop when the apparatus for introducing droplets has been pulled out, the holder for the dropletizer units cannot be removed from the reactor at least in the course of operation, and so work on the holder has to be conducted directly in situ.

In order that it is possible to pull out individual apparatuses for introduction of droplets during the operation of the reactor, it is necessary to configure the feed to the dropletizer units in such a way that each can be closed separately for each apparatus for introduction of droplets. In this way, the feed to the apparatus for introduction of droplets to be pulled out can be closed, while the feeds to the other apparatuses remain open, in order to enable further operation.

The holder for the dropletizer units may be a pipe with dropletizer plates mounted at the base thereof. Alternatively, the dropletizer units may also be holes directly in the pipe.

However, it is preferable when the holder is a frame with a space for at least one dropletizer unit. In this case, the dropletizer unit is inserted into the frame and pushed into the reactor or pulled out of the reactor on the rails together with the frame. The frame together with the space for the dropletizer unit has the advantage that the dropletizer unit can be removed for maintenance, for example. In order to minimize the downtime of the apparatus for introducing droplets, it is additionally possible to exchange the dropletizer units being used for other, new dropletizer units or ones which have been through maintenance. For this purpose, it is merely necessary to pull the apparatus for introduction of droplets out of the reactor for the time which is required to remove the old dropletizer units and insert the new dropletizer units. These can then be put through maintenance when the apparatus together with the new dropletizer units has been pushed in again and monomer solution is being added via this dropletizer unit as well.

Especially in the case of the reactor of high diameter, for example in the range from 1.5 m to 25 m, the frame has spaces for several dropletizer units. For example, it is possible to provide the frame with spaces for two or three dropletizer units. It is of course also possible to position more than three dropletizer units in a frame. The number of dropletizer units always depends on the length of the region in which droplets are to be produced and the length of a dropletizer unit. The shorter a dropletizer unit and the longer the region in an apparatus for producing droplets in which droplets are being produced, the greater the number of dropletizer units needed.

If a plurality of dropletizer units are to be positioned in a frame, it is possible to provide one space for a plurality of dropletizer units, or else alternatively a plurality of spaces each for one or more dropletizer units. If more than one dropletizer unit is to be positioned in a space, the space and the dropletizer units are preferably configured such that the dropletizer units rest on two opposite sides of the frame and two adjacent dropletizer units abut one another. In this case, it is also possible to configure the dropletizer units in such a way that each has a contact surface for an adjacent dropletizer unit on one side and rests on the contact surface of the adjacent dropletizer unit on the other side. The foremost dropletizer unit in the frame likewise rests on the frame on the side pointing away from the adjacent dropletizer unit, such that it is in contact with the frame on three sides and with the adjacent dropletizer unit on the fourth side. Alternatively, it is of course also possible that a space is provided for each dropletizer unit, such that each dropletizer unit is connected to the frame over the entire periphery.

Especially when a plurality of dropletizer units are provided in an apparatus for introduction of droplets, it is preferable when the dropletizer units each have a cuboidal shape. In this way, it is possible to define clear edges by which the respective dropletizer units are secured to the frame and, if necessary, adjoin adjacent dropletizer units.

In a particularly preferred embodiment, each dropletizer unit has a housing concluded by the dropletizer plate at the base thereof. To form the droplets, holes are formed in the dropletizer plate, through which the liquid flows. It is preferable here when the number of holes relative to the area formed by the line connecting the outermost holes is in the range of from 100 to 1000 holes/$m^2$, preferably in the range of from 150 to 800 holes/$m^2$ and more particularly in the range of from 200 to 500 holes/$m^2$. This ensures that there is a sufficient distance between the droplets formed at the holes and that said droplets can additionally come into sufficient contact with the gas flowing through the reactor. In order to obtain droplets of a suitable size for water-absorbing polymers, it is additionally preferable when the holes in the dropletizer plates have a diameter in the range from 25 to 500 μm.

The liquid to be dropletized, for example the monomer solution, flows through the dropletizer plate into the reactor and forms droplets as it does so. In doing so, the liquid typically exits from the holes of the dropletizer plate in the form of a liquid jet which then breaks up into droplets in the reactor. The disintegration of the liquid jet depends firstly on the amount of the liquid which exits through the holes per unit time, and secondly on the velocity and the volume of the gas flowing through the reactor. The properties of the monomer solution and the geometry of the holes also affect the type of jet breakup. In the context of the present invention, droplet breakup is also referred to as dropletization.

The housing is provided with a feed through which the liquid flows into the housing. In the housing, the liquid is distributed by means of the dropletizer plate and flows through the holes of the dropletizer plate, resulting in formation of the droplets. It is advantageous here when the liquid is introduced into the housing under pressure, such that the entire space above the dropletizer plate in the housing is filled with liquid and the liquid is forced into the reactor through the holes under pressure. The feed for the liquid to be dropletized comprises, for example, a flexible pipeline or a hose, in which case the flexible pipeline or hose opens into the housing above the dropletizer plate. The use of the flexible pipeline or hose enables the movement of the apparatus for introduction of droplets without having to deinstall the feed beforehand. It is preferable here to provide every dropletizer unit with a dedicated feed.

Alternatively, however, it is also possible to provide one feed for a plurality of dropletizer units. In this case, for example, it is also possible to provide one feed which, in the case of a plurality of dropletizer units, splits up into a plurality of outlets each connected to a dropletizer unit. Alternatively, however, it is also possible for the feed to open into the first dropletizer unit and to provide a connection between each of the dropletizer units, through which the liquid can flow from one dropletizer unit into the next, in order to supply all the dropletizer units with liquid. However, it is preferable to provide one feed for each dropletizer unit, in which case this feed may also be an outlet from a common feed line.

In order to enable undisrupted movement of the holder for the at least one dropletizer unit on the at least one rail, it is preferable when the holder for the at least one dropletizer unit is guided on the at least one rail with rollers or slide contacts. A suitable material for the rollers or slide contacts is any material typically used for the purpose. However, it should be ensured that no material which leads to damage to the product produced in the reactor, or which is damaged by the substances used in the reactor or the pressure and temperature conditions in the reactor, is used for the rollers or slide contacts.

Because of the simpler installation and handling and for avoidance of further moving parts, especially of axis/hub joints, which can be blocked, for example, as a result of deposits in the reactor, it is preferable to use slide contacts. Suitable slide contacts are, for example, sheets made from polymers, where the polymer may comprise additives, for example lubricants or fillers, and also further additives that are otherwise customary for polymers, for example plasticizers. A material used for the slide contacts is preferably a polymer based on polyether ether ketone, polyoxymethylene, polyamide, polyethylene terephthalate or polytetrafluoroethylene. A particularly preferred material for the slide contact is a polymer based on polyether ether ketone.

The apparatus of the invention for introducing droplets into a reactor is preferably used in a reactor for droplet polymerization, especially for the production of water-absorbing polymer particles, for example based on poly(meth)acrylates.

A reactor of this kind for droplet polymerization generally comprises a head with an apparatus for introduction of droplets of a monomer solution, a middle region through which the dropletized monomer solution falls and is converted to the polymer, and a fluidized bed into which the polymer droplets fall. The fluidized bed concludes the region of the reactor in which the hydraulic internal diameter decreases at the lower end.

In order that the monomer solution leaving the apparatus for introduction of droplets is not sprayed onto the wall of the reactor, and in order at the same time to configure the reactor advantageously both in terms of structural analysis and in terms of material expenditure, it is preferable to form the head of the reactor in the shape of a frustocone and to position the apparatus for introduction of droplets in the frustoconical head of the reactor.

The frustoconical configuration of the head of the reactor makes it possible to economize on materials compared to a cylindrical configuration. Moreover, a frustoconically configured head improves the static stability of the reactor. A further advantage is that the gas and the droplets of the monomer solution may be better brought into contact with one another. The problem of fouling has the effect that it would not be possible to make the apparatus for dropletization larger even for a cylindrical configuration of the reactor though in this case the cross-sectional area for the gas feed would be substantially larger and a large portion of the gas would therefore require a substantially longer period of time before contact with the droplets takes place and said portion is admixed into the stream comprising the droplets. Further, at a cone aperture angle of more than 7° the gas flow detaches from the surface and forms vortices which in turn contributes to faster commixing.

In order to keep the height of the reactor as low as possible, it is further advantageous when the apparatus for dropletization of the monomer solution is disposed as far upward as possible in the frustoconically configured head. This means that the apparatus for dropletization of the monomer solution is disposed at the height in the frustoconically configured head at which the diameter of the frustoconically configured head is roughly the same as the diameter of the apparatus for dropletization.

In order to prevent the monomer solution which exits the apparatus for dropletization in the region of the outermost holes from being sprayed against the wall of the frustoconically configured head, it is preferable when the hydraulic diameter of the frustoconically configured head, at the height at which the apparatus for dropletization is disposed, is from 2% to 30%, more preferably from 4% to 25%, and more particularly from 5% to 20%, larger than the hydraulic diameter of the area enclosed by a line connecting the outermost holes. The somewhat larger hydraulic diameter of the head additionally ensures that droplets, even below the reactor head, do not prematurely hit the reactor wall and adhere thereto.

Above the apparatus for introduction of droplets of the monomer solution there is an addition point for gas, and so gas and droplets flow in cocurrent through the reactor from top downward. Since the fluidized bed is in the lower region of the reactor, the effect of this is that gas flows in the opposite direction from the bottom upward in the lower region of the reactor. Since gas is introduced into the reactor both from the top and from the bottom, the gas needs to be withdrawn between the apparatus for dropletization of the monomer solution and the fluidized bed. It is preferable for the gas withdrawal point to be positioned at the transition from the cylindrical wall of the reactor to the region having a decreasing hydraulic internal diameter. The corresponding widening in the cross section to the maximum reactor diameter at the height of the gas withdrawal point prevents particle entrainment into the reactor offgas. The size of the cross-sectional area of the gas withdrawal ring is such that the mean gas velocity in the ring is 0.25 to 3 m/s, preferably 0.5 to 2.5 m/s, and more particularly 1.0 to 1.8 m/s. Smaller values reduce particle entrainment but lead to uneconomically large dimensions, while larger values lead to an undesirably high level of particle entrainment.

The region of the reactor where the gas withdrawal point is positioned preferably has a configuration such that the diameter of the region having a decreasing hydraulic internal diameter is greater at the upper end thereof than the diameter of the upper section of the reactor. The gas flowing through the reactor from the top flows around the lower end of the reactor wall of the upper section and is withdrawn via at least one gas draw point from the annular space formed between the upper end of the region having a decreasing hydraulic internal diameter and the lower end of the reactor wall that projects into the region having a decreasing hydraulic internal diameter. Connected to the gas draw point is an apparatus for removing solids, in which polymer particles which are drawn off from the reactor together with the gas flow can be removed. Suitable apparatuses for removing solids are, for example, filters or centrifugal separators, for example cyclones. Particular preference is given to cyclones.

According to the invention, the hydraulic diameter of the fluidized bed is chosen such that the area of the fluidized bed is at least sufficiently large that a droplet falling vertically downward from the outermost holes of the apparatus for introduction of droplets falls into the fluidized bed. For this purpose, the area of the fluidized bed is at least just as large, and of just the same shape, as the area formed by a line connecting the outermost holes of the apparatus for introduction of droplets. In addition, it is also possible for the surface area of the fluidized bed to be greater than the area formed by the line connecting the outermost holes of the apparatus for introduction of droplets. It is particularly preferable for the surface area of the fluidized bed to be 5% to 50%, more preferably 10% to 40%, and more particularly 15% to 35%, greater than the area formed by the line connecting the outermost holes of the apparatus for introduction of droplets. In this case, the shape of the surface area of the fluidized bed is the same in each case as the shape of the area which is enclosed by the line connecting the outermost holes. If, for example, the surface area of the fluidized bed is circular, the area enclosed by the line connecting the outermost holes is also circular, although the diameter of the surface area of the fluidized bed may be greater than the diameter of the area which is formed by the line connecting the outermost holes of the apparatus for introduction of droplets.

In order that enough gas can flow past the apparatus for introduction of droplets of the monomer solution, so that a uniform gas velocity in the reactor can be achieved and there is no excessive acceleration and vortexing of the gas as it flows around the apparatus, it is further preferable for the ratio of the area covered by the apparatus for introduction of droplets in the reactor to the area which is enclosed by the line connecting the outermost holes to be less than 50% and preferably in the range between 3% and 30%.

It is further preferable for the number of holes based on the area which is formed by the line connecting the outermost holes to be in the range from 100 to 1000 holes/m$^2$, preferably in the range from 150 to 800 holes/m$^2$ and more particularly in the range from 200 to 500 holes/m$^2$. This ensures that there is a sufficient distance between the droplets formed at the holes and that said droplets can additionally come into sufficient contact with the gas flowing through the reactor.

In one embodiment, the apparatus for introduction of droplets of the monomer solution comprises channels wherein the holes are formed in the bottom and which are arranged in a star shape. The star-shaped arrangement of the channels, makes it possible, especially in a reactor having a circular cross section, to obtain a uniform distribution of the droplets in the reactor. Addition is effected via the channels into which the monomer solution is introduced. The liquid exits through the holes in the bottom of the channels and forms the droplets.

In order that the droplets exiting from the channels come into contact very quickly with the gas flowing around the channels, it is further preferable when the channels have a very narrow width. The width of the channels is preferably in the range of from 25 to 500 mm, more preferably in the range of from 100 to 400 mm, and more particularly in the range of from 150 to 350 mm.

In order to avoid transportation of droplets onto the wall of the reactor, it is advantageous when the dropletizer plate is configured such that holes that are not on a center line of the dropletizer plate are aligned such that the monomer solution is introduced into the reactor through the holes at an angle to the vertical, with alignment of the holes, in the case of a radial alignment of axially symmetric dropletizer plates, in such a way that the angle at which the monomer solution is introduced into the reactor decreases in the direction of the reactor axis, and with alignment of the holes, in the case of dropletizer plates arranged parallel to one another, on a line running parallel to the center line in each case, such that the angle with which the monomer solution is introduced into the reactor is constant.

The corresponding arrangement of the holes in the dropletizer plates affords a sufficient distance between the individual droplets in the reactor, such that they do not coalesce and, in addition, all the droplets are surrounded by sufficient gas to enable the reaction of the monomer solution to give the poly(meth)acrylate. In addition, the entire cross section of the reactor can be exploited. A further advantage of the inventive apparatus for introduction of droplets is that the cross-sectional area which is covered by the apparatus is very small, such that sufficient gas can flow around the apparatus. In addition, the individual portions of the apparatus can be configured with the minimum possible width, in order to minimize the apparatus for introduction of the monomer solution from influencing the flow of the gas.

In one embodiment, the distance between the apparatus for dropletization of the monomer solution and the surface of the fluidized bed is constant over the entire surface area of the fluidized bed. In this case, the droplets leave the apparatus parallel to the reactor axis. However, because of the gas flow in the reactor, it is not possible to rule out the possibility of droplets hitting the wall of the reactor, adhering there and forming encrustation. In order to avoid this risk, it is alternatively possible to configure the apparatus for dropletization of the monomer solution in such a way that, given a constant height of the fluidized bed, the distance between the apparatus for dropletization of the monomer solution and the surface of the fluidized bed increases from the outside to the middle of the reactor. In this case, the monomer solution leaves the apparatus for dropletization at an angle in the direction of the central axis of the reactor, such that removal of the droplet from the vertical flight path in the direction of the wall does not necessarily lead to the droplet hitting the wall.

In a further embodiment, several apparatuses for introduction of droplets of the monomer solution are provided, which run parallel to one another. In this case, the dropletizer plates are preferably rectangular, and the holes along the center line that extends parallel to the long edges of the rectangle are preferably aligned such that the monomer solution drips vertically downward, parallel to the axis of the reactor, and the holes that are not on the center line are aligned such that the liquid exits at an angle to the axis of the reactor. It is possible here to keep the angle the same or to execute the holes such that the angle increases toward the edges of the dropletizer plate.

In a preferred embodiment, several apparatuses for introduction of droplets are included, each of which is aligned radially. This gives rise to a star-shaped arrangement of the apparatuses for introduction of droplets into the reactor, although the apparatuses for introduction of droplets into the reactor may be of different length. In the case of a radial arrangement of the apparatuses for introduction of droplets into the reactor in which the apparatuses for introduction of droplets into the reactor are of different length, it is preferable for the apparatuses for introduction of droplets into the reactor to extend to different degrees from the outside in the direction of the middle of the reactor. The arrangement is preferably such that one or more comparatively short apparatuses for introduction of droplets into the reactor are positioned between two apparatuses for introduction of droplets into the reactor that project as far as the middle, with a decrease in the length of the apparatuses for introduction of droplets into the reactor from one apparatus for introduction of droplets into the reactor which projects as far as the middle of the reactor up to the center line between the two apparatuses for introduction of droplets into the reactor that project as far as the middle of the reactor, and with an increase again from the center line between the two apparatuses for introduction of droplets into the reactor that project into the middle of the reactor to the second apparatus for introduction of droplets into the reactor that projects to the middle of the reactor. In the case of radial arrangement of the apparatuses for introduction of droplets into the reactor, holes which extend along the center line of the dropletizer plates are aligned such that the monomer solution drips vertically downward through these holes, and monomer solution exits at an angle relative to the axis of the reactor from holes that are not on the center line, and it is possible here too to keep the angle of all the holes that are not on the center line the same or to execute the holes such that the angle increases toward the edges of the dropletizer plate. Preferably, in the case of a radial arrangement of the apparatuses for introduction of droplets into the reactor, the angle at which the monomer solution is added decreases toward the axis of the reactor. In this way, the monomer solution is introduced at a greater angle through the holes further removed from the axis, such that the droplets that form fly further away from the apparatus for introduction of droplets into the reactor, such that a homogeneous droplet distribution is obtained over the cross section of the reactor.

In the embodiment with radial arrangement of the dropletizer plates, the decreasing angle at which the monomer solution is introduced into the reactor is obtained, for example, by virtue of an apparatus for introduction of droplets into the reactor being sealed by at least two dropletizer plates and the angle at which the monomer solution is dropletized into the reactor being constant for each row of holes in a dropletizer plate, the angles being less in the dropletizer plates disposed closer to the middle of the reactor than the angles of the dropletizer plates disposed further to the outside.

When a plurality of apparatuses for introduction of droplets are provided and run parallel, it is preferable when at least two distributor arrangements each having at least two dropletizer plates arranged parallel to one another are arranged at an angle relative to one another, so as to give rise to a multiangular pitch. Distributor arrangement is understood to mean the apparatuses for introduction of droplets aligned parallel to one another in each case. When the apparatuses for introduction of droplets in the distributor arrangements are arranged at an angle of 90° relative to one another, the result is a rectangular pitch, and in the case of an angle of 60° a triangular pitch. As well as an angle between the channels of the individual distributor arrangements of 90° or 60°, any other angle, for example 45°, is also possible. However, the effect of other angles is generally that different polygons are formed by the crossing apparatuses for introduction of droplets. Preference is given to an arrangement of the apparatuses for introduction of droplets such that crossing apparatuses for introduction of droplets give rise to a triangular pitch or rectangular pitch, the distance between the apparatuses for introduction of droplets running parallel being very substantially the same, such that equilateral triangles are formed by the crossing apparatuses for introduction of droplets in the distributor arrangements in the case of triangular pitch, and squares in the case of rectangular pitch.

When the channels are arranged so as to give rise to a multiangular pitch, it is advantageous to introduce the apparatuses for introduction of droplets that run parallel to one another with different distributor arrangements into the reactor at different levels, such that they cross but do not intersect at the same height, in order to enable the respective apparatuses for introduction of droplets to be pushed in and out.

The angle at which the monomer solution is introduced into the reactor is preferably in the range from 0° to 30°, more preferably in the range from 0.1° to 20° and especially in the range from 0.2° to 15°. The angle depends on the velocity at which the monomer solution is introduced into the reactor and the magnitude of the distance between two apparatuses for introduction of droplets, in order that the trajectories of the droplets leaving two adjacent apparatuses for introduction of droplets do not intersect.

As well as the embodiment in which a dropletizer plate has constant angles and the angles of the individual dropletizer plates of an apparatus for introduction of droplets are different, it is also possible and preferable when, in the case of radial arrangement of the dropletizer plates, the angle at which the monomer solution is introduced into the reactor increases from the center of the reactor outward in a dropletizer plate. This configuration of the dropletizer plates affords further homogenization of the droplet distribution over the cross section of the reactor.

Embodiments of the invention are shown in the figures and are more particularly described in the description which follows.

Figure 1:
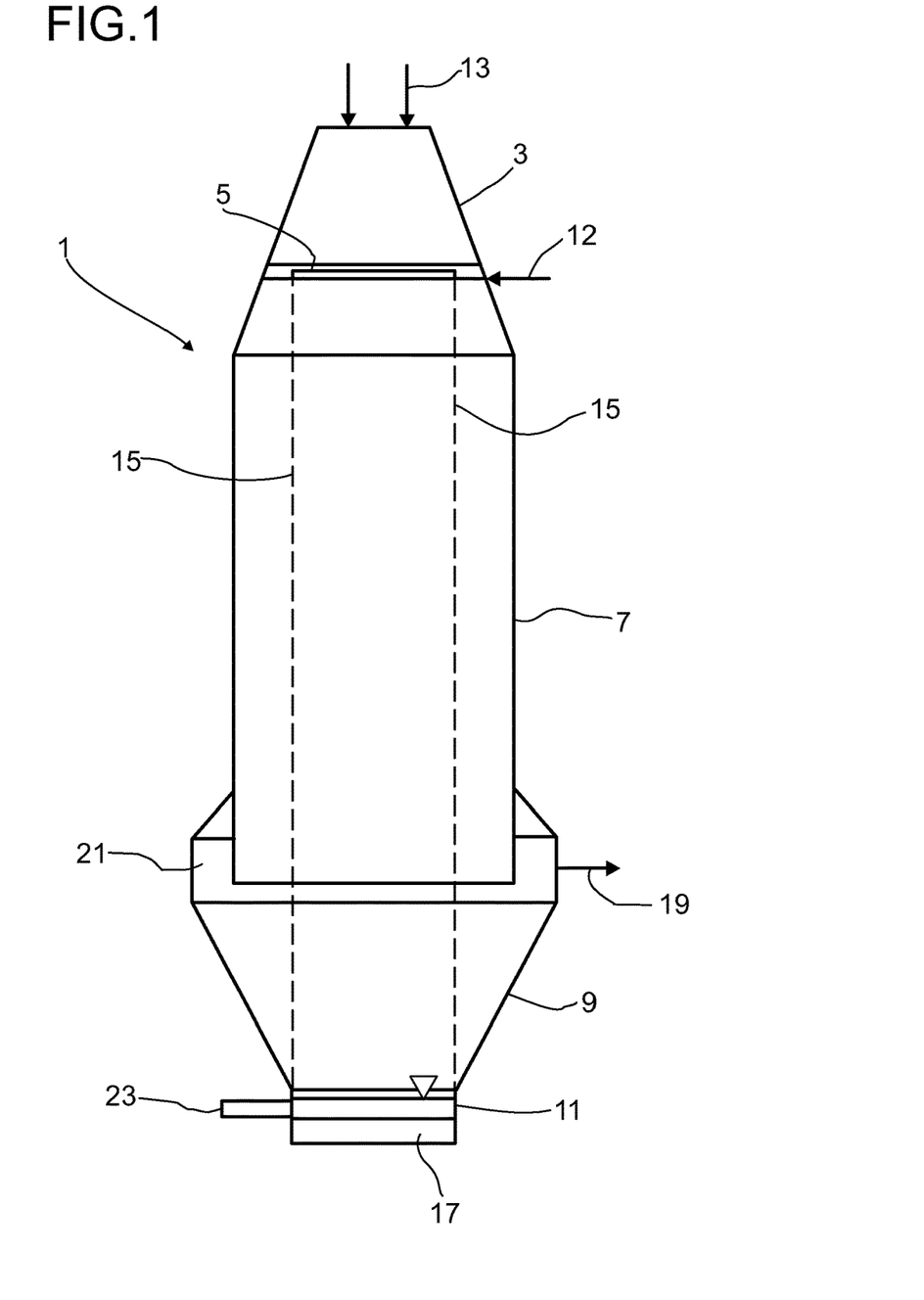
FIG. 1 is a longitudinal section through a reactor for droplet polymerization.

The figures show:

FIG. 1 shows a longitudinal section through a reactor for droplet polymerization.

A reactor 1 for droplet polymerization comprises a reactor head 3 in which at least one apparatus 5 for introduction of droplets is accommodated, a middle region 7 in which the polymerization reaction is performed, and a lower region 9 comprising a fluidized bed 11 in which the reaction is concluded.

The polymerization reaction for producing the poly(meth) acrylate is carried out by supplying the apparatus 5 for introduction of droplets with a monomer solution via a monomer feed 12. If—as shown here—several apparatuses 5 for introduction of droplets are provided, it is preferable to feed the monomer solution to each apparatus 5 for introduction of droplets via a dedicated monomer feed 12. The monomer solution exits through holes, not shown in FIG. 1, in the apparatus 5 for introduction of droplets and breaks up into individual droplets which fall downward in the reactor. A gas, for example nitrogen or air, is introduced into the reactor 1 via a first addition point for a gas 13 above the apparatus 5 for introduction of droplets. This gas flow assists the breakup into individual droplets of the monomer solution exiting from the holes in the apparatus 5 for introduction of droplets. In addition, the gas flow helps to prevent the individual droplets from touching and coalescing to form larger droplets.

In order to make the cylindrical middle region 7 of the reactor as short as possible and also to avoid droplets hitting the wall of the reactor 1, the reactor head 3 preferably has a conical configuration as shown here, the apparatus 5 for introduction of droplets being disposed within the conical reactor head 3 above the cylindrical region. However, it is also possible as an alternative to provide the reactor with a cylindrical configuration in the reactor head 3 as well, with a diameter the same as that of the middle region 7. However, a conical configuration of the reactor head 3 is preferred. The position of the apparatus 5 for introduction of droplets is chosen such that there is still a sufficiently large distance between the outermost holes through which the monomer solution is supplied and the wall of the reactor to prevent the droplets from hitting the wall. To this end, the distance should be at least in the range of from 50 to 1500 mm, preferably in the range of from 100 to 1250 mm and more particularly in the range from 200 to 750 mm. It will be appreciated that a greater distance from the wall of the reactor is also possible. However, a corollary of greater distance is poorer utilization of the reactor cross section.

The lower region 9 is capped off with a fluidized bed 11 and the polymer particles formed from the monomer droplets during the fall, fall into said fluidized bed. The postreaction to afford the desired product is performed in the fluidized bed. According to the invention the outermost holes through which the monomer solution is dropletized are positioned such that a droplet falling vertically downward falls into the fluidized bed 11. This can be achieved, for example, by virtue of the hydraulic diameter of the fluidized bed being at least as great as the hydraulic diameter of the area which is enclosed by a line connecting the outermost holes in the apparatuses 5 for introduction of droplets, the cross-sectional area of the fluidized bed and the area formed by the line connecting the outermost holes having the same shape and the centers of the two areas being at the same position in a vertical projection of one onto the other. The outermost position of the outer holes relative to the position of the fluidized bed 11 is shown in FIG. 1 using a dotted line 15.

In order, in addition, to prevent droplets from hitting the wall of the reactor in the middle region 7 as well, the hydraulic diameter at the height of the midpoint between the apparatuses 5 for introduction of droplets and the gas withdrawal point is at least 10% greater than the hydraulic diameter of the fluidized bed.

The reactor 1 may have any desired cross-sectional shape. However, the cross section of the reactor 1 is preferably circular. In this case, the hydraulic diameter is the same as the diameter of the reactor 1.

Above the fluidized bed 11, the diameter of the reactor 1 increases in the embodiment shown here, and so the reactor 1 widens conically from the bottom upward in the lower region 9. This has the advantage that polymer particles that are formed in the reactor 1 and hit the wall can slide downward along the wall into the fluidized bed 11. To avoid encrustation, it is additionally possible to provide tappers, not shown here, on the outside of the conical section of the reactor, said tappers being used to set the wall of the reactor in vibration, which causes adhering polymer particles to become detached and slide into the fluidized bed 11.

For gas feeding for the operation of the fluidized bed 11, a gas distributor 17 beneath the fluidized bed 11 blows the gas into the fluidized bed 11.

Since gas is introduced into the reactor 1 both from the top and from the bottom, it is necessary to withdraw gas from the reactor 1 at a suitable position. For this purpose, at least one gas withdrawal point 19 is disposed at the transition from the middle region 7 having a constant cross section to the lower region 9 which widens conically from the bottom upward. Here, the wall of the cylindrical middle region 7 projects into the lower region 9 which widens conically in the upward direction, the diameter of the conical lower region 9 at this position being greater than the diameter of the middle region 7. In this way, an annular chamber 21 which encircles the wall of the middle region 7 is formed, into which the gas flows and can be drawn off through the at least one gas withdrawal point 19 connected to the annular chamber 21.

The postreacted polymer particles of the fluidized bed 11 are withdrawn via a product withdrawal point 23 in the region of the fluidized bed.

Figure 2:
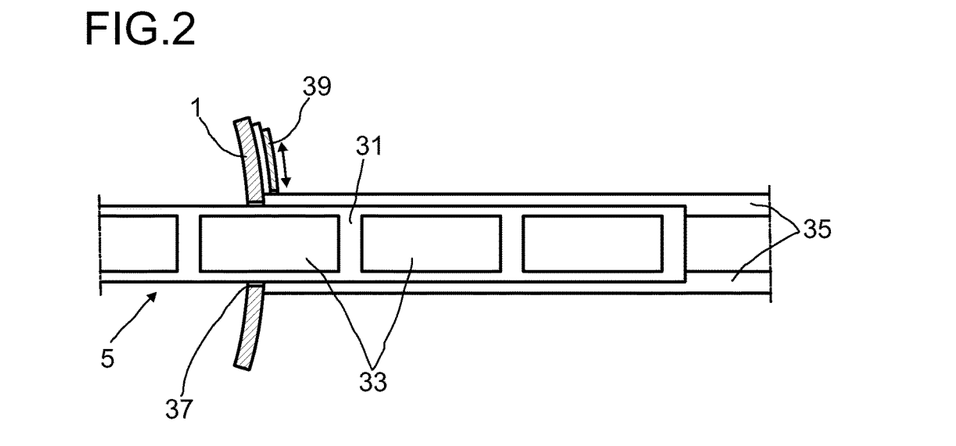
FIG. 2 is a top view of a guide for an apparatus for introduction of droplets, with the holder for at least one dropletizer unit partly pulled out, in a first embodiment.

FIG. 2 shows an apparatus for introduction of droplets partly pulled out of the reactor, in a three-dimensional view.

According to the invention, the apparatus 5 for introduction of droplets comprises a holder 31 for at least one dropletizer unit. The holder 31 for the at least one dropletizer unit, in the embodiment shown here, is configured as a frame in which spaces 33 for the dropletizer units are formed.

In order to be able to pull the holder 31 for the at least one dropletizer unit out of or to be able to insert it into the reactor 1, the holder 31 is guided on rails 35. In the embodiment shown here, two parallel rails 35 are provided, on which the holder 31 for the at least one dropletizer unit rests. In the representation according to FIG. 2, the rails 35 are rails outside the reactor 1.

The holder 31 for the at least one dropletizer unit can be pulled out of the reactor through an opening 37. In order to enable further operation of the reactor when several apparatuses 5 for the introduction of droplets are provided and only one of the apparatuses 5 has been pulled out, it is possible to provide a flap 39 with which the opening 37 is closed when the holder 31 has been pulled out.

Figure 3:
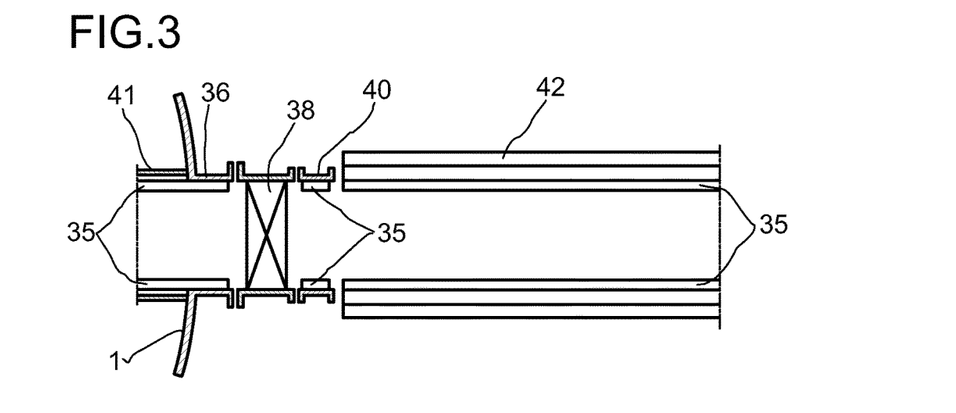
FIG. 3 is a top view of a guide for an apparatus for introduction of droplets in a second embodiment.
Figure 4:
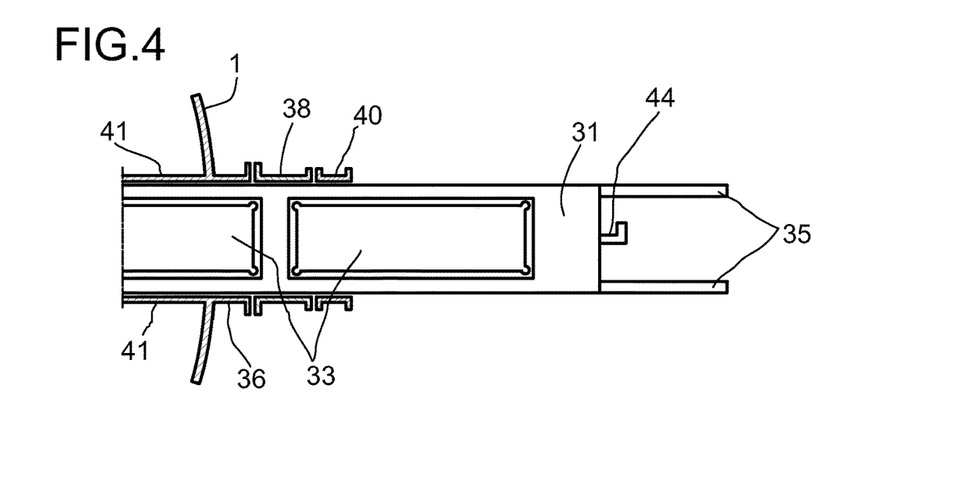
FIG. 4 is a top view of the guide shown in FIG. 3, with the holder for at least one dropletizer unit partly pulled out.

FIGS. 3 and 4 show an alternative embodiment of an apparatus for introduction of droplets, FIG. 3 showing a guide for an apparatus for introduction of droplets and FIG. 4 the guide from FIG. 3 with the holder 31 for the at least one dropletizer unit partly pulled out.

In contrast to the embodiment in FIG. 2, in the embodiment shown in FIGS. 3 and 4, there is a flange 36 formed on the reactor, with a closure unit 38 installed thereon. The closure unit 38 may, for example, be a flap, a closure valve or a slide valve. A spacer 40 adjoins the closure unit 38. Following on from the spacer 40 are the rails 35 on which the holder 31 for the at least one dropletizer unit is guided. The rails 35 may be installed, for example, with a suitable frame construction 42. The rails are arranged such that the holder 31 for the at least one dropletizer unit can be pulled out of the reactor 1 without wedging. In order to enable undisrupted movement of the dropletizer unit, the flange 36 and the spacer 40 are preferably each provided with an internal contact rail.

In order to be able to pull out the holder 31 for the at least one dropletizer unit, it is possible, for example, to provide the holder 31 with a catch 44. The catch 44 is engaged by a suitable counterpart, in order to enable automated pulling-out and pushing-in of the holder 31. For this purpose, it is possible, for example, with the aid of a drive, for example an electric motor, to move the counterpart parallel to the rail 35 and thus to push in or pull out the holder 31 when the movable counterpart is connected to the catch 44.

Within the reactor 1, the holder 31 for the at least one dropletizer unit is preferably guided within a pipe 41.

Figure 5:
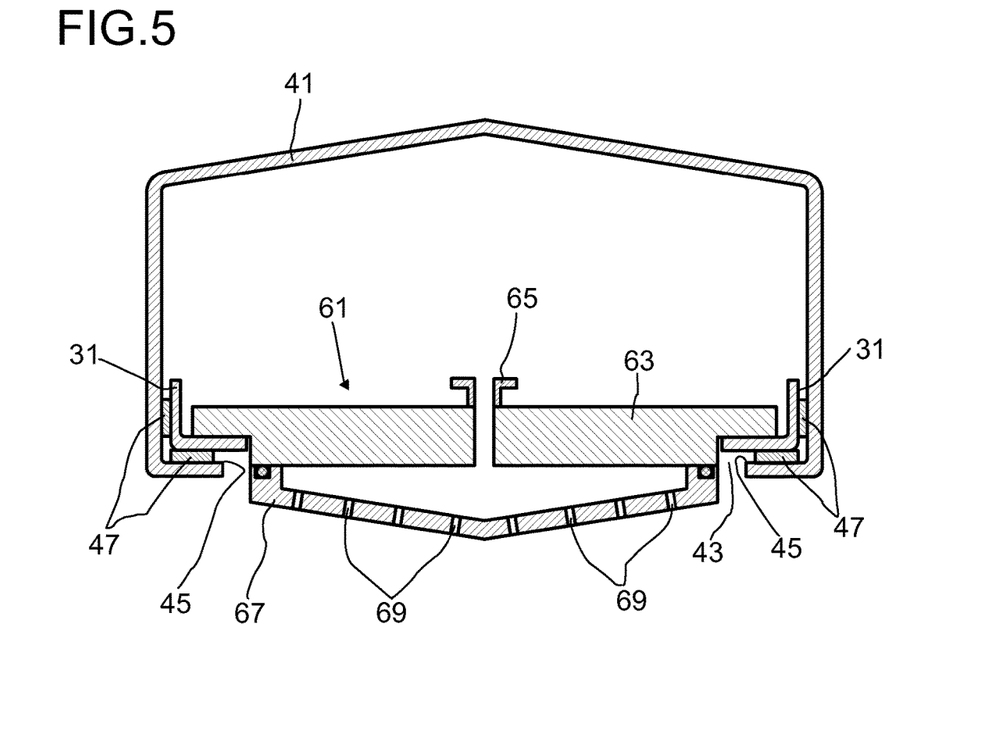
FIG. 5 is a sectional diagram of an apparatus for introduction of droplets into a reactor.

A sectional view through the apparatus for introduction of droplets which is guided within a pipe is shown in FIG. 5.

In the embodiment shown here, the pipe 41 has a polygonal cross section with 5 vertices. Alternatively, however, any other cross section is possible for the pipe 41 within which the holder 31 can be moved.

The pipe 41 has, at its base, an opening 43 through which the droplets produced by the dropletizer units can be introduced into the reactor. In the embodiment shown here, the edges of the opening 43 are curved, such that each of these forms a contact surface 45 that serves as a rail. The holder 31 for the dropletizer units is guided on these contact surfaces. For undisrupted movement of the holder 31 on the contact surface 45 that serves as a rail, slide contacts 47 are provided on the holder 31, which can be moved on the contact surface 45. Suitable material used for the slide contacts 47 is, for example, a polymer based on polyether ether ketone, polyoxymethylene, polyamide, polyethylene terephthalate or polytetrafluoroethylene, especially polyether ether ketone. As an alternative to the slide contacts, it is also possible to provide rollers on the holder 31, which run on the contact surfaces 45 that form the rails in the reactor 1 and on the rails 35 outside the reactor 1. As an alternative, it is also possible to install the rollers instead of the slide contacts on the rails outside the reactor 1 and on the contact surface 45 within the reactor 1. Preference is given, however, to the installation of rollers on the holder 31.

In the embodiment shown in FIG. 5, a dropletizer unit 61 is installed on the holder 31.

The dropletizer unit 61 comprises an upper housing section 63 with a feed 65 for the liquid. The upper housing section 63 is joined at its base to a dropletizer plate 67 which forms the lower housing section. Formed in the dropletizer plate 67 are holes 69 through which the liquid runs out of the dropletizer unit 61 and breaks down into droplets. In order to obtain a liquid-tight connection of the upper housing section 63 and dropletizer plate 67, as shown here, a seal is preferably introduced between the upper housing section 63 and dropletizer plate 67. The seal may be manufactured from any desired seal material known to those skilled in the art, which is inert and stable with respect to the solution to be dropletized and especially also stable with respect to the temperatures in the reactor. Suitable materials for the seal are, for example, thermally stable elastomers, polyamides, PTFE, silicone, silicone rubber MVQ, fluoro rubber FPM, perfluoro rubber FFPM or EPDM.

Figure 6:
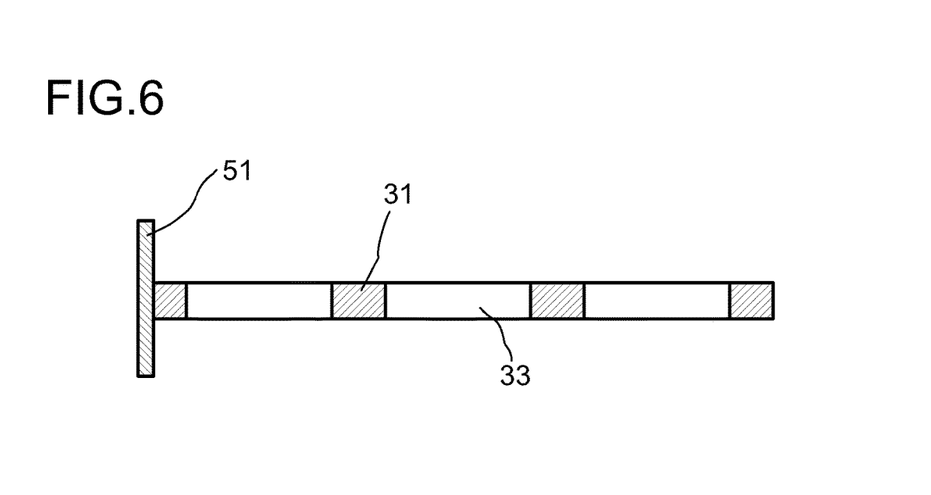
FIG. 6 is a longitudinal section through a holder for dropletizer units.

FIG. 6 shows a longitudinal section through a holder 31 for at least one dropletizer plate, with a stop formed at the end thereof.

As already shown in FIGS. 2 and 4, the holder 31 has a plurality of spaces 33 for the dropletizer units. In order to close the opening 37 in the reactor 1 with the holder 31 pulled out—unlike in the embodiments with a closure unit 38 or flap 39 shown in FIGS. 2 to 4—a stop 51 is formed at the end of the holder 31 in the embodiment shown here. The stop 51 may be manufactured from any desired material and is preferably shaped such that it adjoins the reactor wall on the inside with the holder 31 pulled out. In this way, the opening 37 in the reactor wall is closed. It is preferable to form the stop 51 from an elastic and sealing material, for example an elastomer or PTFE. It is also possible to execute the stop, for example, with metal, for example steel, preferably with the same material as the holder 31, and to provide it with a coating of an elastomer or PTFE, in which case the coating is provided in such a way that it adjoins the reactor wall with the holder 31 pulled out.

LIST OF REFERENCE NUMERALS 1 reactor
3 reactor head
5 apparatus for dropletization
7 middle region
9 lower region
11 fluidized bed
12 monomer feed
13 addition point for gas
15 position of the outermost holes in relation to the fluidized bed 11
17 gas distributor
19 gas withdrawal point
21 annular chamber
23 product withdrawal point
31 holder
33 space for dropletizer unit
35 rail
36 flange
37 opening
38 closure unit
39 flap
40 spacer
41 pipe
42 frame construction
43 opening
44 catch
45 contact surface 47 slide contact
51 stop
61 dropletizer unit
63 upper housing section
65 feed
67 dropletizer plate
69 hole

The invention claimed is:

1. A reactor with an apparatus for introduction of droplets into a reactor (1), comprising a holder (31) for at least one dropletizer unit (61), where the dropletizer unit (61) has a feed (65) for a liquid to be dropletized and a dropletizer plate (67) and the dropletizer plate (67) has holes (69) through which a liquid to be dropletized is introduced into the reactor (1), where the holder (31) for the at least one dropletizer unit (61) can be pushed into the reactor (1) or pulled out of the reactor (1) through an opening (37) in the shell of the reactor (1), wherein at least one rail (45) is accommodated within the reactor (1) and is used to guide the holder (31) for the at least one dropletizer unit (61) along it.

2. The reactor according to claim 1, wherein the holder (31) for the at least one dropletizer unit (61) being guided is suspended on the rail.

3. The reactor according to claim 1, wherein the holder (31) being guided within the reactor rests on two rails (45).

4. The reactor according to claim 3, wherein the rails are two contact surfaces (45) on a pipe (41) which is open at the bottom and on which the holder (31) for the at least one dropletizer unit (61) rests.

5. The reactor according to claim 4, wherein the contact surfaces (45) run parallel to the opening (43) at the base of the pipe (41).

6. The reactor according to claim 4, wherein the contact surfaces (45) bound the opening (43) at the base of the pipe (41) in axial direction.

7. The reactor according to claim 1, wherein at least one rail (35) is provided in the region of the opening (37) outside the reactor (1) and is used to guide the holder (31) for the at least one dropletizer unit (61) along it when it is pulled out of the reactor (1) or pushed into the reactor (1).

8. The reactor according to claim 7, wherein the at least one dropletizer unit (61) can be deinstalled outside the reactor (1).

9. The reactor according to claim 1, wherein a flap (39) mounted in the opening (37) can be used to close the opening (37) when the holder (31) for the at least one dropletizer unit (61) has been pulled out.

10. The reactor according to claim 9, wherein the flap (39) is mounted on the outside of the reactor shell and is closed electrically, mechanically, hydraulically or pneumatically when the holder (31) for the at least one dropletizer unit (61) has been pulled out of the reactor (1).

11. The reactor according to claim 1, wherein a stop (51) formed at the end of the holder (31) for the at least one dropletizer unit (61) stops the holder (31) for the at least one dropletizer unit (61) at the inside of the reactor shell when it is pulled out, and closes the opening (37) when the holder (31) for the at least one dropletizer unit (61) has been pulled out.

12. The reactor according to claim 1, wherein the holder (31) is a frame having a space (33) for the dropletizer unit (61).

13. The reactor according to claim 12, wherein the frame has spaces (33) for several dropletizer units (61).

14. The reactor according to claim 1, wherein each dropletizer unit (61) has a housing (63) concluded by the dropletizer plate (67) at the base thereof.

15. The reactor according to claim 14, wherein the feed (65) for the liquid to be dropletized comprises a flexible pipeline or hose, the flexible pipeline or hose opening into the housing (63) above the dropletizer plate (67).

16. The reactor according to claim 1, wherein the holder (31) for the at least one dropletizer plate (61) is guided on the at least one rail (45) with rollers or slide contacts (47).

17. The reactor according to claim 16, wherein the material used for the slide contacts (47) is a polymer based on polyether ether ketone, polyoxymethylene, polyamide, polyethylene terephthalate or polytetrafluoroethylene.

* * * * *